(12) United States Patent
Krishnan et al.

(10) Patent No.: US 12,443,439 B2
(45) Date of Patent: Oct. 14, 2025

(54) SUPPLY CHAIN RESILIENCE IN TASK NETWORKS

(71) Applicant: SAP SE, Walldorf (DE)

(72) Inventors: Kavitha Krishnan, Bangalore (IN); Debashis Banerjee, Bengaluru (IN)

(73) Assignee: SAP SE, Walldorf (DE)

( * ) Notice: Subject to any disclaimer, the term of this patent is extended or adjusted under 35 U.S.C. 154(b) by 455 days.

(21) Appl. No.: 18/159,846

(22) Filed: Jan. 26, 2023

(65) Prior Publication Data
US 2024/0256330 A1  Aug. 1, 2024

(51) Int. Cl.
*G06F 9/48* (2006.01)
*G06F 11/16* (2006.01)

(52) U.S. Cl.
CPC ........ *G06F 9/4881* (2013.01); *G06F 11/1629* (2013.01)

(58) Field of Classification Search
None
See application file for complete search history.

(56) References Cited

U.S. PATENT DOCUMENTS

| | | | | |
|---|---|---|---|---|
| 7,206,770 | B2 * | 4/2007 | Tsui | G06N 3/049 |
| | | | | 706/15 |
| 10,091,288 | B2 * | 10/2018 | Moore | H04L 67/62 |
| 11,287,274 | B1 * | 3/2022 | Robles | G01C 21/3476 |
| 11,328,357 | B2 * | 5/2022 | Amicangioli | G06Q 40/04 |
| 11,336,683 | B2 * | 5/2022 | Gorrepati | H04L 63/1416 |
| 11,348,064 | B1 * | 5/2022 | Altenhoff | G01C 21/3415 |
| 11,748,696 | B2 * | 9/2023 | Altenhoff | G06Q 10/08 |
| | | | | 705/338 |

* cited by examiner

*Primary Examiner* — Van H Nguyen
(74) *Attorney, Agent, or Firm* — Buckley, Maschoff & Talwalkar LLC

(57) ABSTRACT

A system and method are provided including a memory storing processor-executable program code; and a processing unit to execute the processor-executable program code to: receive a first task map including a plurality of nodes, each node representing an executable process for completion of a task; identify a first node of the plurality of nodes as a starting node representing the first process for completion of the task; identify a second node of the plurality of nodes as the ending node representing the last process for completion of the task; generate a first sequence order of node execution for completion of the task based on a target parameter; identify an anomaly; generate a second sequence order of node execution for completing the task based on the target parameter; and execute the nodes in the generated second sequence order. Numerous other aspects are provided.

20 Claims, 11 Drawing Sheets

SUPPLY CHAIN RESILIENCE IN TASK NETWORKS

BACKGROUND

Process modeling is a technique that involves creating a visual depiction of a process to provide a somewhat broad overview of how a process works. Organizations make use of software-based process modeling tools to manage day-to-day organizational activities such as accounting, procurement, project management, risk management and compliance and supply chain operations. Each activity may include one or more tasks, and each task may include one or more connected processes. When an anomaly occurs in one of the processes, this may negatively impact the other processes as well the task itself. As a non-exhaustive example, consider the task of purchasing an item. The purchasing task includes creating a sales order, calculating a total value of an order, determining whether the item is available, creating an invoice, and receiving payment. In this scenario, an anomaly at any of these steps may delay execution of the task as a whole-purchasing the item.

Systems and methods are desired to reduce the impact of the anomaly such that process disruption is minimized.

Figure 1:
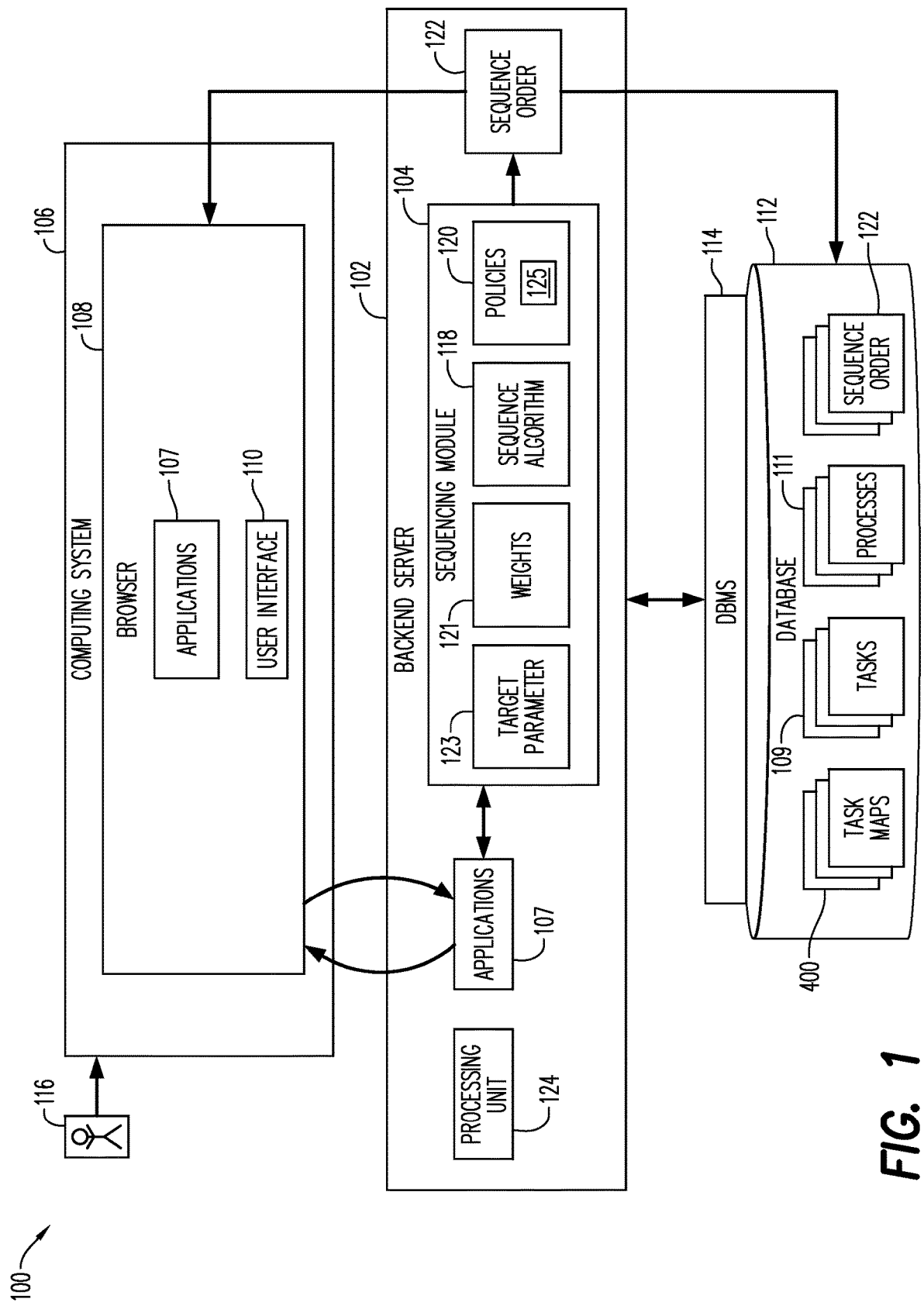
FIG. 1 illustrates a system according to some embodiments.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

It should be appreciated that in development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

As described above, organizations make use of software-based process modeling tools to manage activities associated with operation of the organization. Each activity may include one or more tasks, and each task may include one or more connected processes, such that the processes occur in a particular sequential order. Conventional process monitoring systems focus on anomaly detection and preventative maintenance. However, when an anomaly occurs in one of the processes, this may negatively impact the other processes that follow in the sequence, thereby also negatively impacting the task itself.

By virtue of some embodiments, in response to detection of an anomaly at a process, a sequencing module may generate a different sequential order for the subsequent processes such that the task may be completed while minimizing the negative impact of the anomaly. The sequencing module may change the subsequent process flow (e.g., sequence order of processes) dynamically based on a given context. The following are several non-exhaustive examples.

As a first non-exhaustive example, a flight in transit may detect a fault which needs maintenance and expects a delay. In this example, the task is fly to a destination and the original sequence may have been board, take off, fly to destination, land, disembark at a given time, and the anomaly is the detected fault requiring maintenance during the "fly to destination" process. The sequencing module may now adjust the sequence to include additional steps of retrieve the passenger list, their follow-up flight details and transit, raise a request for alternate booking of flights, and book hotel rooms for the passengers to wait for the next flight.

As a second non-exhaustive example, a manufacturing company warehouse detects that it will be out of space and cannot receive the upcoming goods delivery. The task is to store goods and the original sequence may have been schedule receipt of goods, prepare for receipt of goods, receive goods, store goods, and the anomaly is the detected unavailability of space during the "prepare for receipt of goods" process. The sequencing module may now adjust the sequence to include identifying alternate temporary warehouse space, booking the temporary space, and re-routing the goods. It is noted that as part of the sequence adjustment, the sequencing module may need to take into account additional factors. In this non-exhaustive example, the additional factors for identifying alternate temporary warehouse space may be cost, distance, compliance for type of goods, etc.

Pursuant to embodiments, the sequencing module may use process mining techniques and/or discrete sequence-based techniques to propose alternate process flow sequences based on a context, where the proposed alternate process optimizes a target parameter. The context may include the application of one or more policies on each node.

FIG. 1 is a block diagram of an architecture 100 according to some embodiments. The illustrated elements of architecture 100 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of architecture 100 are implemented by a single computing device, and/or two or more elements of architecture 100 are co-located. One or more elements of architecture 100 may be implemented using cloud-based resources, and/or other systems which apportion computing resources elastically according to demand, need, price, and/ or any other metric.

Architecture 100 includes a backend server 102, a sequencing module 104, a local computing system 106 including a browser 108 and user interface 110, a database 112 storing tasks 109, processes 111, weights 121 and sequence order 122 a database management system (DBMS) 114, and a client/user 116.

The backend server 102 may include applications 107. Applications 107 may comprise server-side executable program code (e.g., compiled code, scripts, etc.) executing within the backend server 102 to receive queries/requests from clients 116, via the local computing system 106, and provide results to clients 116 based on the data of database 112, and the output of the sequencing module 104. A client 116 may access, via the local computing system 106, the sequencing module 104 executing within the server 102, to identify an optimal sequence order for execution of processes included in a task, as described below.

The server 102 may provide any suitable interfaces through which users 116 may communicate with the sequencing module 104 or applications 107 executing thereon. The server 102 may include a Hyper Text Transfer Protocol (HTTP) interface supporting a transient request/ response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

Local computing system 106 may comprise a computing system operated by local user 116. Local computing system 106 may comprise a laptop computer, a desktop computer, or a tablet computer, but embodiments are not limited thereto. Local computing system 106 may consist of any combination of computing hardware and software suitable to allow system 106 to execute program code to cause the system 106 to perform the functions described herein and to store such program code and associated data.

Generally, computing system 106 executes one or more of applications 107 to provide functionality to user 116. Applications 107 may comprise any software applications that are or become known, including but not limited to data analytics applications. Applications 107 may comprise web applications which execute within a web browser 108 of system 106 and interact with corresponding remote cloud-based applications or on-premise server-based applications to provide desired functionality. User 116 may instruct system 106 as is known to execute one or more of applications 107 and may interact with resulting displayed user interfaces 110 of the executing applications 107 to obtain the desired functionality therefrom.

Figure 4:
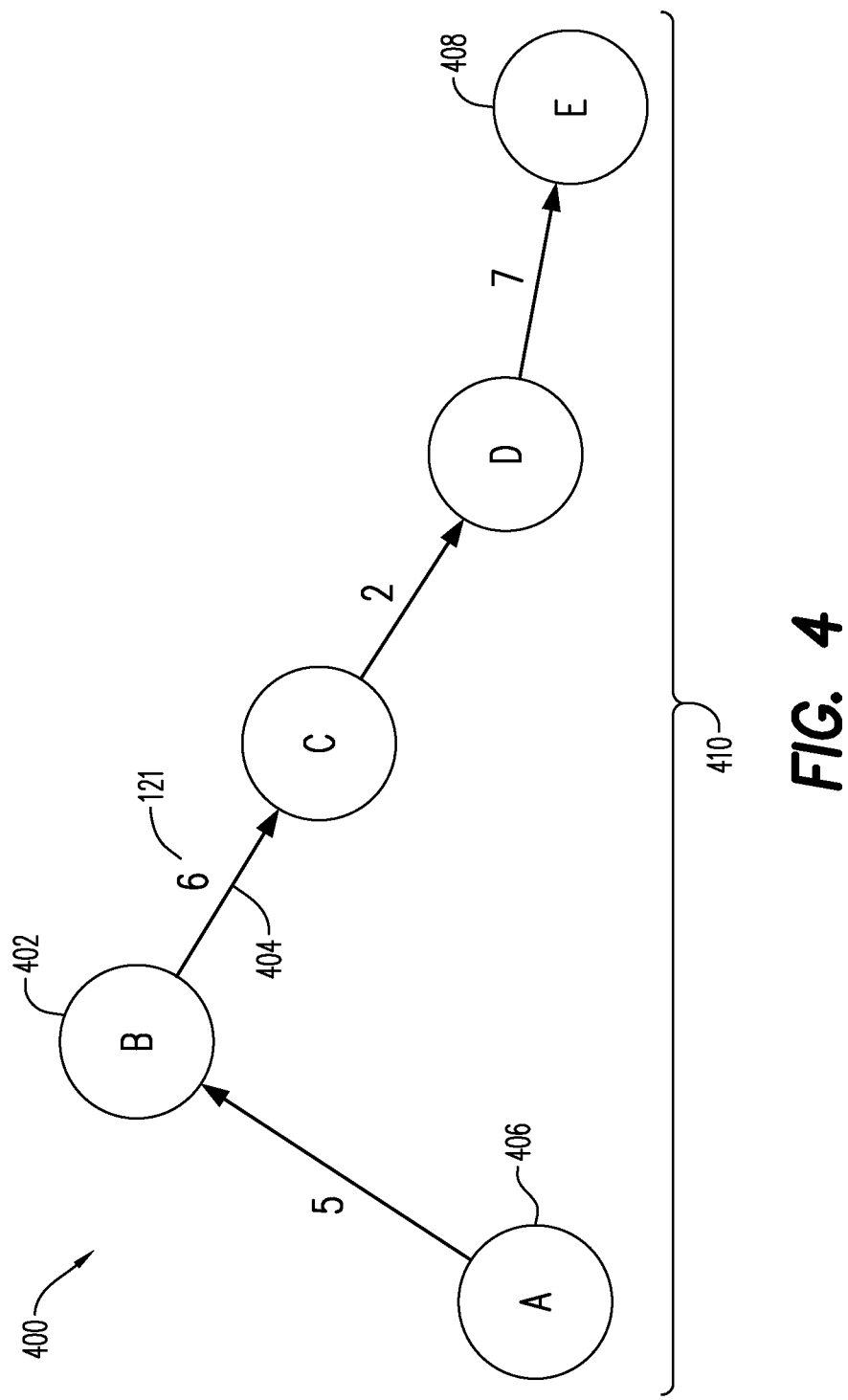
FIG. 4 illustrates a non-exhaustive example of a task map according to some embodiments.

The sequencing module 104 may include a sequence algorithm 118, policies 120, and weights 121. The sequence algorithm 118 may include Dijkstra's algorithm or any suitable algorithm adapted to determine a shortest path between a defined start point and a defined end point. As described above, a task 109 may include a plurality of processes 111. The task 109 may be represented by a task map 400 (FIG. 4) and the processes 111 may be represented by nodes 402 (FIG. 4) in the map 400, such that each node represents an executable process for completion of a task. The nodes 402 may be connected by edges 404 that represent the process flow. Each process flow may have a weight 121 associated therewith. The weight 121 may represent a performance parameter related to the edge and related to an overall target parameter 123. The target parameter 123 may be a constraint for the system. The weight 121 may carry any measurable information that the user is concerned about. As a non-exhaustive example, the target parameter 123 may be amount of time taken for completion of the task, and the performance parameter may be the time it takes to complete the process of a first node to get to the process of the second node (e.g., the weight/performance parameter for the edge connecting the first node to the second node). While the examples herein may describe performance parameters in terms of time, other performance suitable parameters may be used (e.g., cost, risk, combination of resources, distance, compliance, quality, comfort, etc.). It is noted that a same task map may include the same nodes in the same sequential order but may have different weights assigned to the edges for different users/scenarios. For example, one user/scenario, may be concerned with completing the task within the hour, and another user/scenario may be concerned with completing the task with the least risk.

The sequence algorithm 118 may start at the start node ("source node," representing the first process for completion of the task) and analyze the map 400 to find a shortest path between the start node and an end node (representing the last process for completion of the task) and all the other nodes in the graph. The sequence algorithm 118 may keep track of the currently known shortest distance from each node to the source node and updates these values if the sequence algorithm 118 finds a shorter path. Once the sequence algorithm 118 has found the shortest path between the source node and another node, the node may be marked and added to the path. The sequence algorithm 118 may continue until all the nodes in the map have been added to the path. This way, there is a path that connects the source node to all other nodes following the shortest path possible to reach each node and ultimately end at the end node. It is noted that the sequence algorithm 118 may take weights 121 of the edges into account when determining the shortest path.

Figure 8:
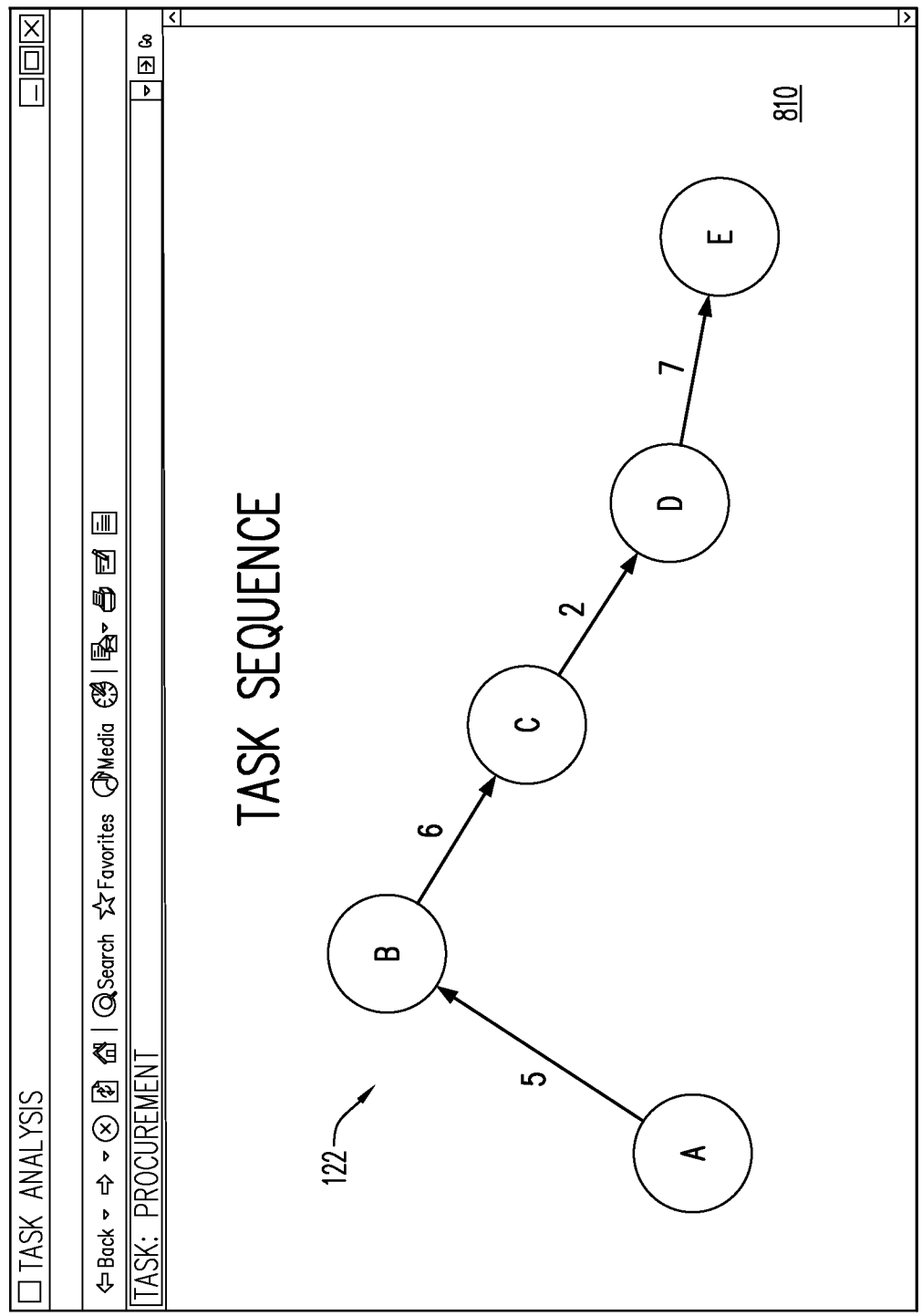
FIG. 8 is another non-exhaustive example of a user interface according to some embodiments.

Pursuant to some embodiments, the sequence algorithm 118 may find this shortest path based on at least one policy 120 for each node 402. Each node 402 may adhere to a set of policies 120, that may include guidelines for execution of the node. For example, a policy for a given node may include a requirement of which other nodes may provide input to the given node; or a requirement of which other nodes may receive output from the given node. Other suitable policies may be included. The policies and weights may provide a context for the sequence algorithm 118 to generate a sequence order 122. As described further below, the sequence order 122 may be displayed in a graphical representation 810 of a user interface display 800 (FIG. 8) for the user 116, and also may be stored in the database 112.

As a non-exhaustive example, consider a production process is going to stop in one week if product X is not received. An impact analysis may determine the outcome of not receiving the product in a week (e.g., what loss will be incurred). If a very good back up of product X is available, and procured in advance, there may be no threat of the production process being stopped, and then the wait for delivery of product X may be tolerated. To that end the sequence algorithm 118 may generate one sequence order. If product X will be needed in a month, the generated sequence order may change. The sequence algorithm 118 generates a sequence order based on the constraints in moving between the nodes and may suggest the best path based on the constraints.

One or more applications 107 executing on backend server 102 or local computing system 106 may communicate with DBMS 114 using database management interfaces such as, but not limited to, Open Database Connectivity (ODBC) and Java Database Connectivity (JDBC) interfaces. These types of applications 107 may use Structured Query Language (SQL) to manage and query data stored in database 112.

DBMS 114 serves requests to store, retrieve and/or modify data of database 112, and also performs administrative and management functions. Such functions may include snapshot and backup management, indexing, optimization, garbage collection, and/or any other database functions that are or become known. DBMS 114 may also provide application logic, such as database procedures and/or calculations, according to some embodiments. This application logic may comprise scripts, functional libraries and/or compiled program code. DBMS 114 may comprise any query-responsive database system that is or becomes known, including but not limited to a structured-query language (i.e., SQL) relational database management system.

Backend server 102 may provide application services (e.g., via functional libraries) which applications 107 may use to manage and query the data of database 112. The application services can be used to expose the database data model, with its tables, hierarchies, views and database procedures, to clients. In addition to exposing the data model, backend server 102 may host system services such as a search service.

Database 112 may store data used by at least one of: applications 107 and the sequencing module 104. For example, database 112 may store the tasks 109 and processes 111 which may be accessed by the sequencing module 104 during execution thereof.

Database 112 may comprise any query-responsive data source or sources that are or become known, including but not limited to a structured-query language (SQL) relational database management system. Database 112 may comprise a relational database, a multi-dimensional database, an extensible Markup Language (XML) document, or any other data storage system storing structured and/or unstructured data. The data of database 112 may be distributed among several relational databases, dimensional databases, and/or other data sources. Embodiments are not limited to any number or types of data sources.

Presentation of a user interface as described herein may comprise any degree or type of rendering, depending on the type of user interface code generated by the backend server 102/local computing system 106.

For example, a client 116 may execute a Web Browser to request and receive a Web page (e.g., in HTML format) from a website application 107 of backend server 102 to provide the UI 700/800 via HTTP, HTTPS, and/or WebSocket, and may render and present the Web page according to known protocols.

Figure 2:
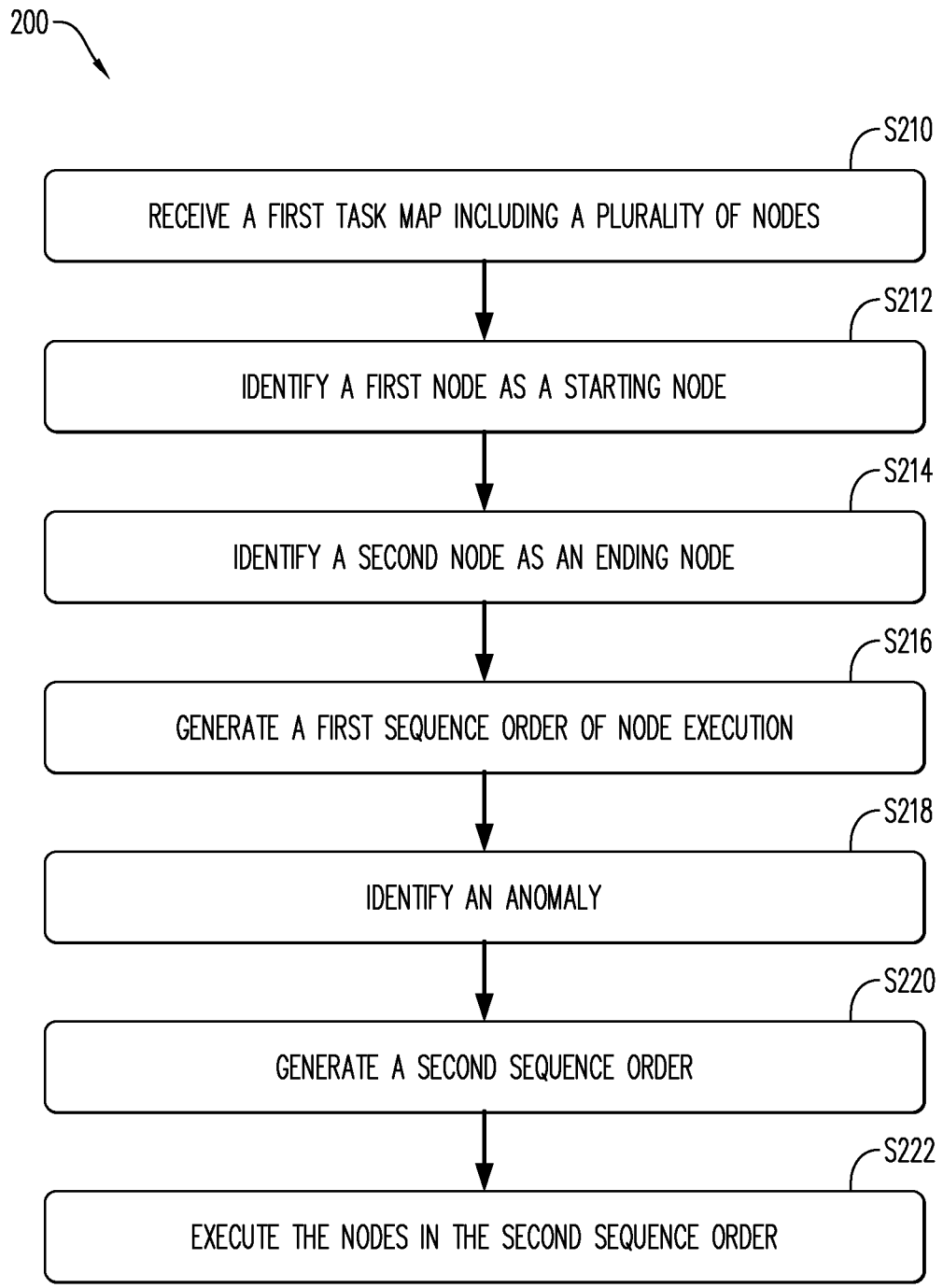
FIG. 2 is a flow diagram of a process according to some embodiments.

FIG. 2 illustrates a method 200 of generating a sequence order for processes in a task in accordance with embodiments. For example, the method 200 may be performed by a database node, a cloud platform, a server, a computing system (user device), a combination of devices/nodes, or the like, according to some embodiments. In one or more embodiments, the computing system 106 or backend server 102 may be conditioned to perform the process 200 such that a processing unit 124 (FIG. 1) of the system 100 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 3:
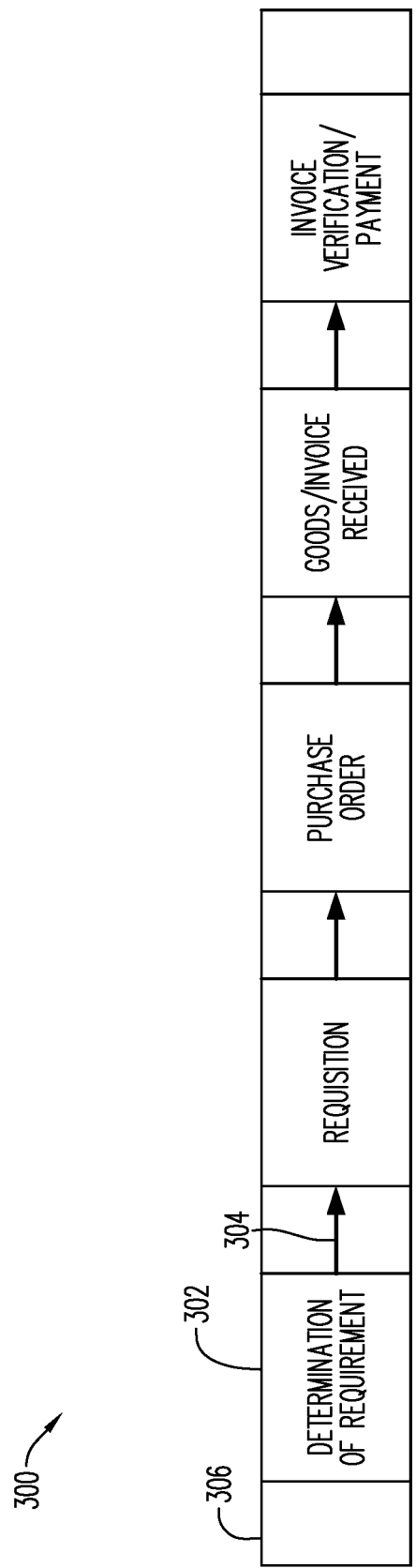
FIG. 3 illustrates a non-exhaustive example of a process flow according to some embodiments.

The method 200 may be described below with respect to a non-exhaustive example of the task of procurement. Every organization acquires material or services to complete its organizational needs. The process of buying materials and obtaining services from vendors or dealers is called procurement. Basic procurement is a process of acquiring goods or services in the right quantity, at the right price, and at the right time. Procurement in many organizations includes several processes which may be performed in the following sequence order: determination of requirement (e.g., what material or services are required), requisition (e.g., the form or electronic transmission used to inform the purchasing department that idem or services are needed), purchase order (e.g., when the requisition is approved it becomes a purchase order), goods receipt/invoice received (e.g., the material is received. Condition and quality are verified. The invoice is received from vendor), and invoice verification/vendor payment (e.g., reconciliation of the invoice and purchase order is accomplished. The vendor is paid). In some organizations, the procurement task may span across different systems, solutions and people. These processes may be part of a task 300, as shown in FIG. 3. Each box may represent a process 302 and each line may represent a process flow 304. In this example, the task 300 may create a document of the process type. For example, there is a process called "purchase order" which may create a document object by the same title. In some embodiments, each process may correspond to a document object. It is noted that some processes may output a document, while other processes may change a status of an existing document. For example, a process may be to close a purchase order, and the output sets a status of the purchase order to "complete".

The process 302 may be an individual application or other process. The task 300 may be executed by a common system, such that each process is part of a common system. In one or more embodiments, each time a process is executed, there may be some record of that execution ("activity") referred to as a "published event". The published event may include data describing the flow that happened between the two nodes, the constraints, performance parameters and the output. The system 100 may include listeners (not shown) that may subscribe to events of a particular type (e.g., purchase order event). Based on the subscription, the listener is notified when the event occurs, and collects the data for the published event. The data may be stored in the database 112 or other suitable storage. The stored data may be used to adjust the weights.

The task 300 may be graphically represented as a task map 400 (FIG. 4) with nodes 402 and edges 404. As described above, each node 402 represents the process 302, and the edge 404 represents the process flow 304. While the example shown herein is relatively simple, the task may include additional transactions resulting in a complex graph with many options for completing the task.

Prior to the start of the process 200, one or more initial tasks and task maps including processes/nodes may be stored in a database 112 or other data store. The initial tasks and corresponding task maps may be templates including standard processes for performing a given task in a given sequence order. The task 300 (FIG. 3) and corresponding task map 400 (FIG. 4) may represent a task/task map template, for example, including a sequence order 410 for execution of the processes. For the task map 400, the sequence order 410 is A→B→C→D→E. In some embodiments, the task/task map may also include initial weights 121 for the processes. The initial weights may be benchmarks set by a process provider. Continuing with the example above, in the case the target is procurement in a given time, the lead time between processes (e.g., how long it takes a process to be completed and transmit output to the next process in the task) is determined and stored as a weight 121 for the node. For example, for a start time X, the system listens for a next correlated event, and tracks that this next correlated event occurs at X+4. Then the system would know the weight for that event is 4. In this case, the requisition may have a weight of 5 and purchase order may have a weight of 6, this may be represented by the weight 121 "5" for process "A" and weight 121 "6" for process "B" in FIG. 4. The weights may be generated based on the target parameter 123.

As a user executes the processes 302 in the task 300, information about the weights/edges of the nodes is generated, and may change the initial weights/edges. For example, one process may be performed more quickly than in the template, resulting in a lower weight for that process than the initial weight. The sequencing module 104 may update the weights 121 for the processes. The sequencing module 104 may also update the weights based on the instant user and other user execution of the task, while accumulating performance parameter values for different targets.

In some embodiments, the target parameter 123 may be a threshold, and whether the threshold is (or is not) crossed, determines other processes that may be performed. For example, the threshold is 45 days to receive invoices of a certain category, and the nodes include several processes for receiving invoices and the number of days each process takes. If target parameter/threshold is met, a first report is run via a process and if the target parameter/threshold is not met, a second reports run via a different process.

Figure 5:
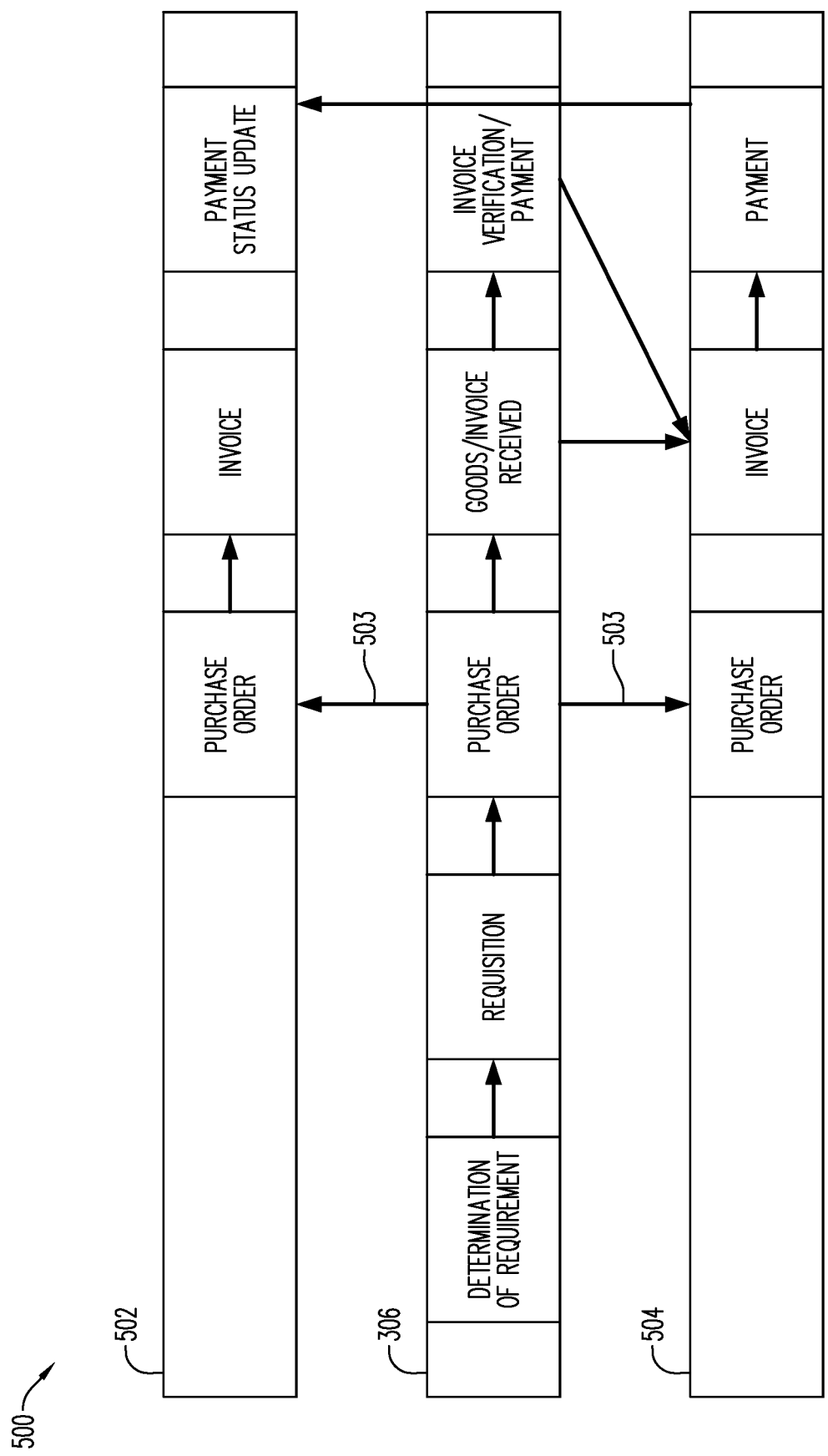
FIG. 5 illustrates an update to the process flow of FIG. 3 according to some embodiments.

Additionally, over time, the task/task map template may evolve as users navigate from one process to another. For example, in FIG. 4, the template of the task map 400 represents the task 300 performable by a centralized platform including an application (or suite of applications) that relate to buyer activities 306 for a buyer platform. The task map 400 may include a starting node 406 and an ending node 408 as part of the sequence order 410. As the user executes this task over time, other processes may be added that are performable by additional systems including applications related to supplier activities 502 (FIG. 5) for a supplier system and enterprise resource planning (ERP) activities 504 (FIG. 5) for an ERP system. For example, as shown in FIG. 5, the task 500 is an updated version of the task 300 in FIG. 3. The FIG. 5 task includes the interaction of processes across different systems including applications for buyer activities 306, supplier activities 502 and ERP activities 504. It is noted that all of the interacting systems may be part of a bigger enterprise or system. Additionally, while FIG. 5 describes the interaction of two systems and a centralized platform, any type of system, platform, and people (e.g., category manager, sourcing agent, etc.) that may interact to perform a task as part of a system may be included. Continuing with the example in FIG. 5, the purchase order application from the buyer activity platform 306 may include a flow 503 to the purchase order application in the supplier activity system 502 and the ERP activity system 504.

Figure 6A:
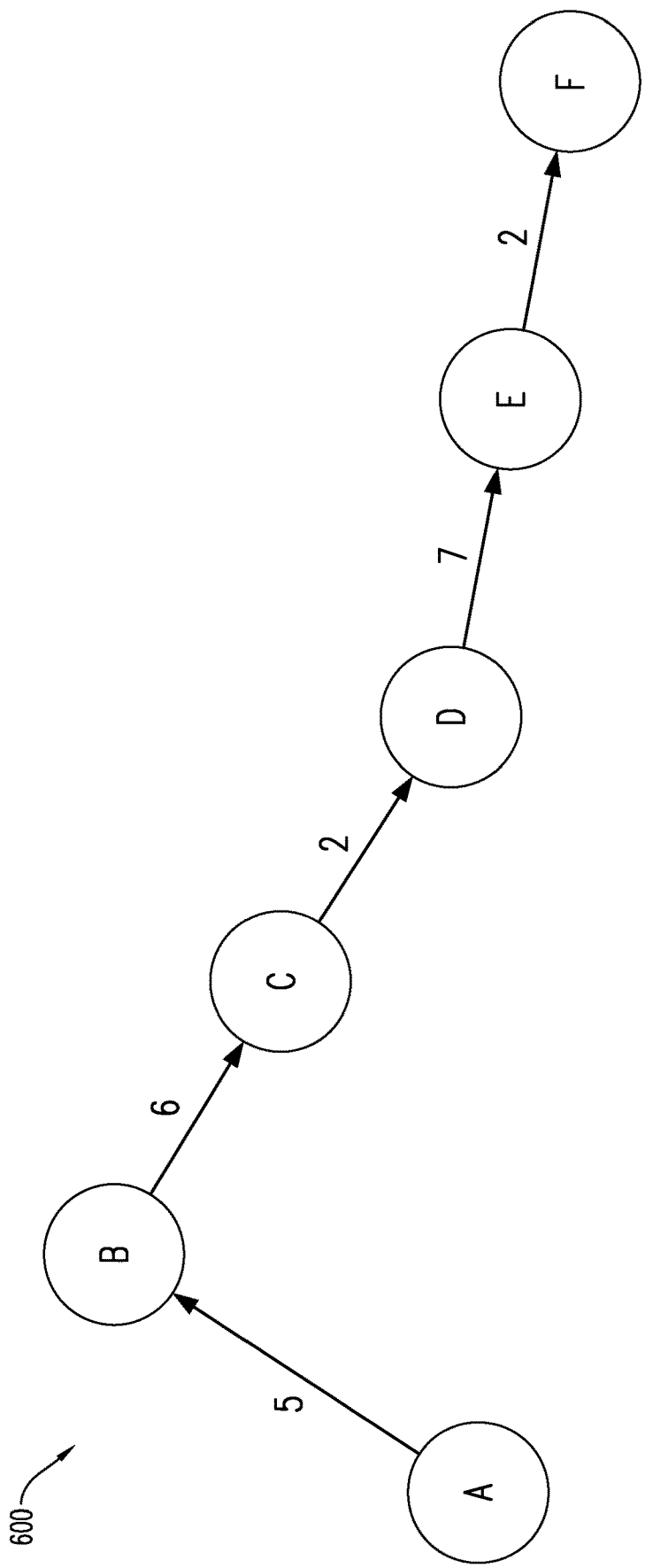
FIG. 6A illustrates another non-exhaustive example of a task map according to some embodiments.
Figure 6B:
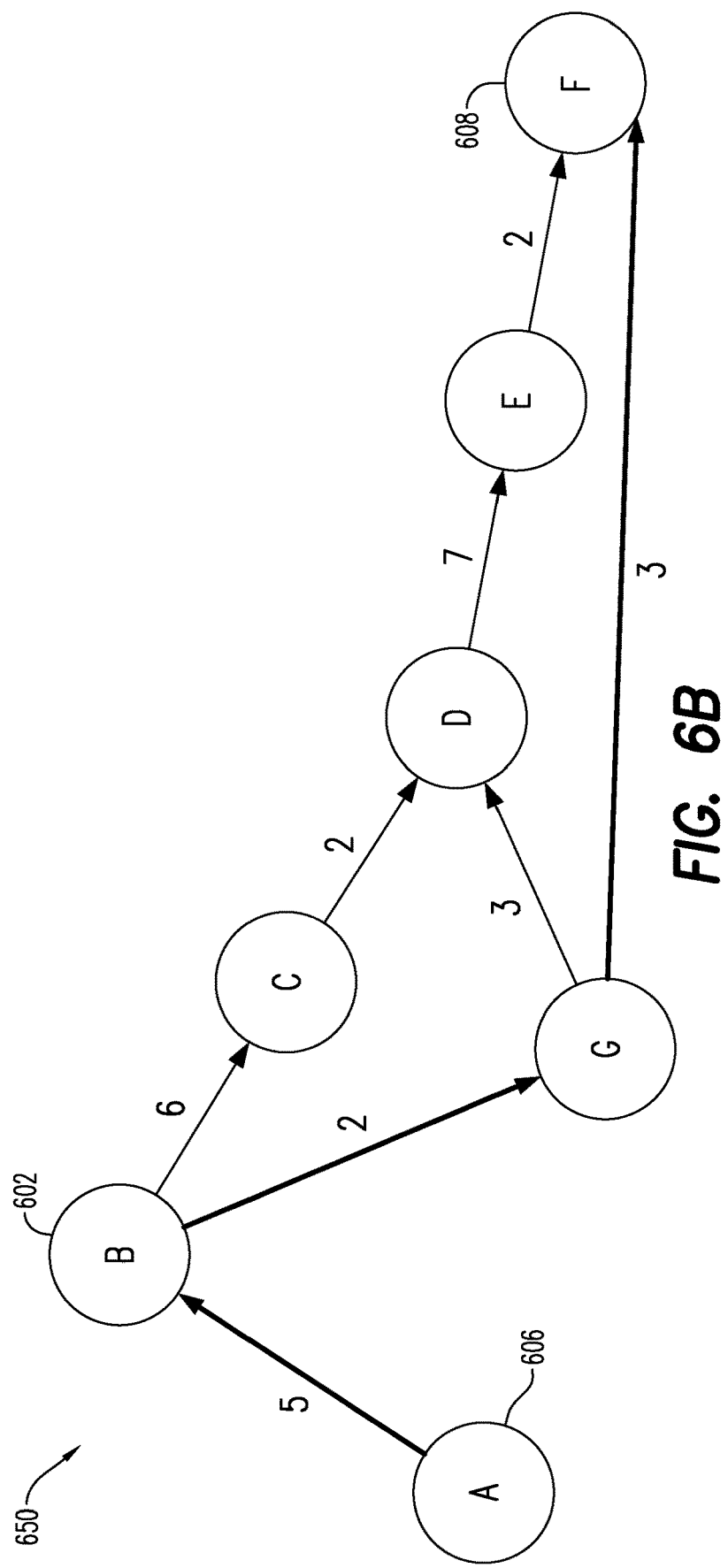
FIG. 6B illustrates an update to the task map of FIG. 6A according to some embodiments.

As another non-exhaustive example of task/task map evolution, consider initially a product is unavailable for performing a process, so that process is not included in the task. Then, the product is available and may be included in the process. The product may then be acquired and thereafter the process is included in the task. Corresponding to this example, FIG. 6A provides a task map 600 where a product is initially unavailable. For this task map 600, the sequence order is A→B→C→D→E→F. FIG. 6B provides an updated task map 650 where the product is available. For this task map 650, there are three possible sequence orders: 1. A→B→C→D→E→F; 2. A→B→G→F; and 3. A→B→G→D→E→F.

Figure 6C:
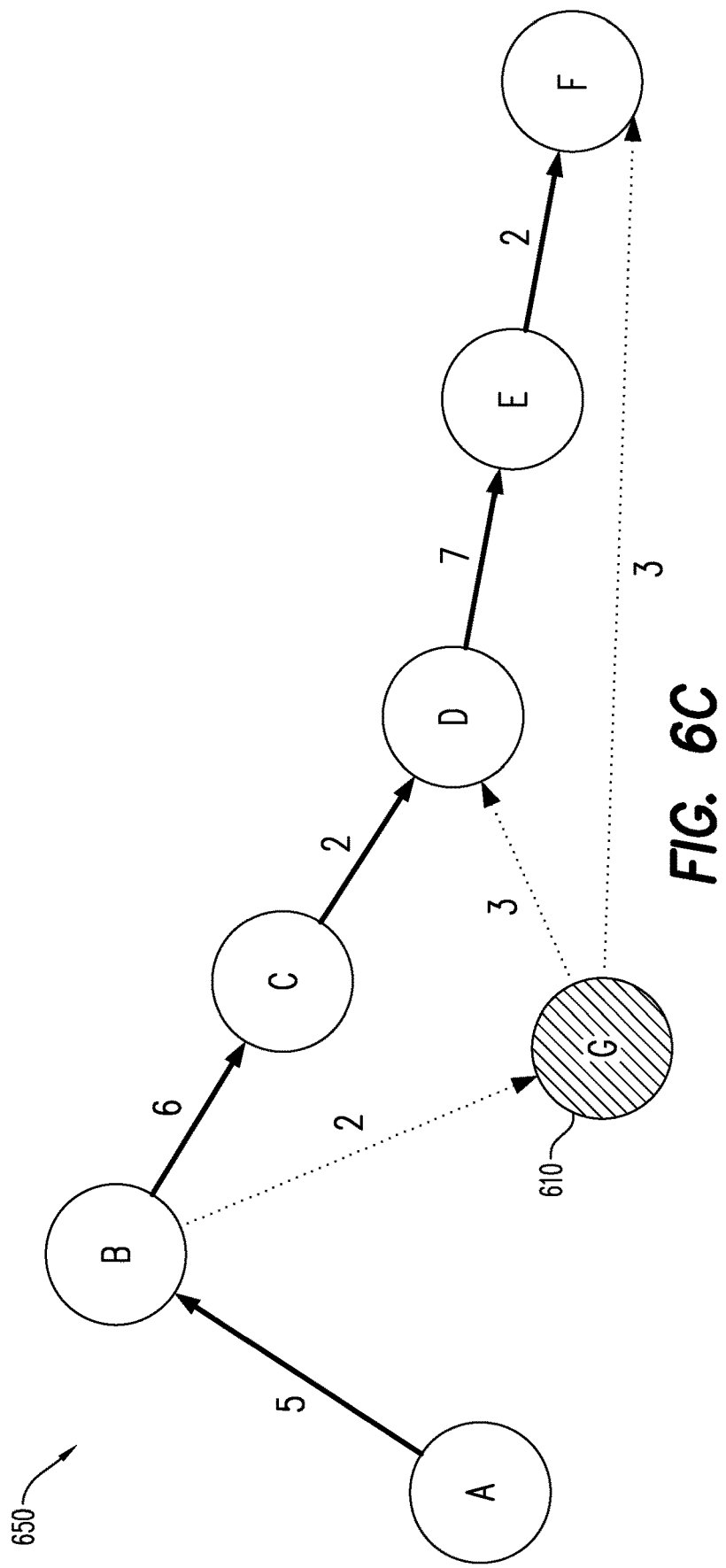
FIG. 6C illustrates an anomaly in the task map of FIG. 6B according to some embodiments.

Initially, at S210 a first task map 650 including a plurality of nodes 602 is received. Each node 602 may include one or more respective policies 120. The sequencing module 104 may receive data including identification of a first node as a starting node 606 at S212 and identification of a second node as an ending node 608 in S214. In some embodiments, the identification may be via user selection on a user interface 700, described further below, or may be based on selection of a target parameter 123 and at least one policy 120 for the nodes included in the map to achieve the target parameter. In this example, for the target parameter 123, the starting node 606 may be "A" and the ending node 608 may be "F". Next, based on the target parameter 123, policy 120 and weights 121, the sequence algorithm 118 generates a first sequence order 122 for the nodes 602 in the map 650 in S216. As shown in FIG. 6B, the first sequence order 122 may be A→B→G→F, as indicated by the bold arrows. This first sequence order 122 may have the shortest weight path as determined by the sequence algorithm 118. The target parameter 123 may be achieved based on a combination of the weights/performance parameters. Continuing with the example, this first sequence order has a weight path of 5(A)+2(B)+3(G)=10. The other possible sequence orders in FIG. 6B have a weight path of 5(A)+6(B)+C(2)+D(7)+E(2) =22; and A(5)+B(2)+G(3)+D(7)+E(2)=19. An anomaly 610 is identified in S218. In some embodiments, the anomaly may be triggered via human intervention, via an anomaly definition 125 included with the node policy 120 for each node, or via other suitable trigger. With respect to the anomaly definition 125, the anomaly definition 125 may include a threshold value that may be crossed by the node itself. The node notifies the system of crossing the threshold and changes its node status to "anomalous", as a non-exhaustive example of a trigger. Another non-exhaustive example of a trigger may be receipt of an anomaly event document/notification. The system 100 may receive notification of the anomaly by listening for an anomaly event. This anomaly event may be, for example, node "B" tries to interact with node "E", and node "E" is no longer available. After a pre-defined number of attempted interactions, or a pre-defined passage of time, with node "E" by node "B" and/or other nodes, node "E" may be given a status of "anomalous." It is noted that in some embodiments, the nodes in the first sequence order may be executed before the anomaly is identified, and in other embodiments, identification of the anomaly does not require execution of the first sequence order. For example, the system 100 may receive notification that a process is unavailable prior to execution of the first sequence order. The anomaly 610 is represented by patterned node "G" in FIG. 6C. The sequence algorithm 118 may receive notification of this anomaly 610, and in a case that a node in the first generated sequence order is unavailable due to the anomaly, the sequence algorithm 118 may generate a second sequence order 122 order in S222. The second sequence order may be different from the first sequence order after a node prior to the node with the identified anomaly. For example, the first sequence order and the second sequence order may be the same until node "B", as node "B" is the node prior to the anomaly node "G". The sequence algorithm 118 may check the weights of the available nodes and generate the second sequence order 122 based on the policy of the present available nodes with respect to the target parameter. Continuing with the example from FIG. 6B, the sequence algorithm 118 may determine the second sequence order 122 to be A→B→C→D→E→F, indicated by bold arrows in FIG. 6C. The task map 650 may then be executed via the second sequence order 122 in S224. In a case the first sequence order was executing when the anomaly was identified, execution of the second sequence order may begin at a node prior to the node with the identified anomaly, bypassing the anomalous node.

In some embodiments, the notification of the anomaly may trigger one or more corrective actions. The corrective action may be one of automatic and manual. Additionally, when the corrective action is completed, a status of the anomalous node may be returned to a "normal" status (from "anomalous") and the old shortest path may be restored. Continuing with the Example in FIG. 6C, when node "G" is returned to "normal" status, the sequence order for execution may return to the first sequence order 122: A→B→G→F.

Figure 7:
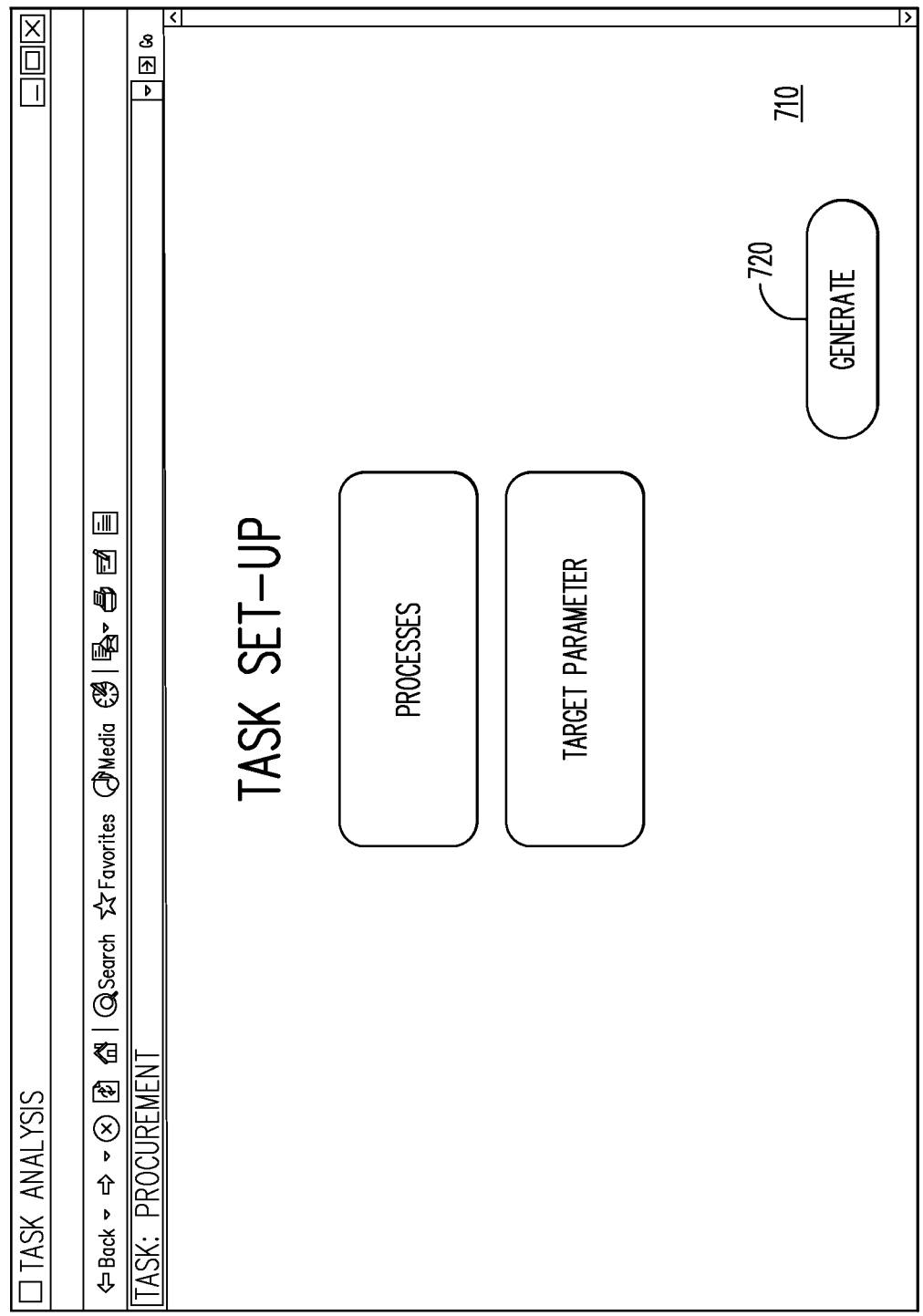
FIG. 7 is a non-exhaustive example of a user interface according to some embodiments.

FIG. 7 is a task analysis display 700 according to some embodiments. The display 700 includes a graphical representation 710 of processes and target parameters to generate a task map including a sequence order for executing the tasks. Selection of a portion or element of the display 700 may result in the presentation of additional information about that portion or element (e.g., selecting "Processes" in FIG. 7 may result in a pop-up window or navigation to another screen presenting data elements that may change, for example, processes available for the given task and selection of a start and end node) and/or let an operator or administrator enter or annotate additional information about the target parameter, weights for the processes, etc. Selection of a "Generate" icon 720 (e.g., by touchscreen or computer mouse pointer, etc.) may cause the system or platform to generate a sequence order for the processes steps.

Figure 9:
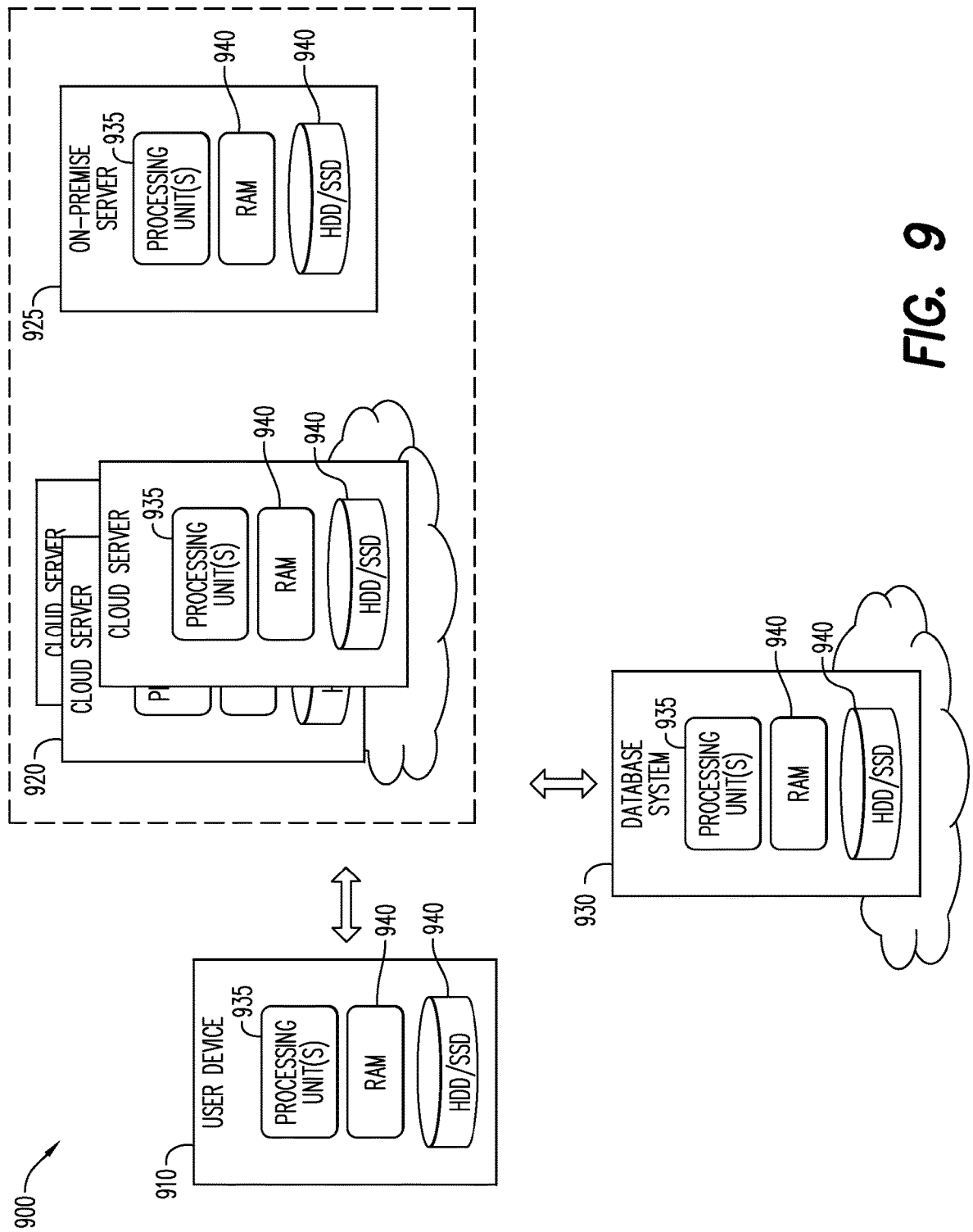
FIG. 9 is a block diagram of a cloud-based database deployment architecture according to some embodiments.

FIG. 9 illustrates a cloud-based database deployment 900 according to some embodiments. The illustrated components may reside in one or more public clouds providing self-service and immediate provisioning, autoscaling, security, compliance and identity management features.

User device, such as a node, 910 may interact with applications executing on one of the cloud application server 920 or the on-premise application server 925, for example via a Web Browser executing on user device 910, in order to create, read, update and delete data managed by database system 930. Database system 930 may store data as described herein and may execute processes as described herein to cause the execution of the sequencing module by the node/user device 910. Cloud application server 920 and database system 930 may comprise cloud-based compute resources, such as virtual machines, allocated by a public cloud provider. As such, cloud application server 920 and database system 930 may be subjected to demand-based resource elasticity. Each of the node/user device 910, cloud server 920, on-premise application server 925, and database system 930 may include a processing unit 935 that may include one or more processing devices each including one or more processing cores. In some examples, the processing unit 935 is a multicore processor or a plurality of multicore processors. Also, the processing unit 935 may be fixed or it may be reconfigurable. The processing unit 935 may control the components of any of the node/user device 910, cloud server 920, on-premise application server 925, and database system 930. The storage devices 940 may not be limited to a particular storage device and may include any known memory device such as RAM, ROM, hard disk, and the like, and may or may not be included within a database system, a cloud environment, a web server or the like. The storage 940 may store software modules or other instructions/executable code which can be executed by the processing unit 935 to perform the method shown in FIG. 2. According to various embodiments, the storage device 940 may include a data store having a plurality of tables, records, partitions and sub-partitions. The storage device 940 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
   a memory storing processor-executable program code; and
   a processing unit to execute the processor-executable program code to:
   receive a first task map including a plurality of nodes, each node representing an executable process for completion of a task;
   identify a first node of the plurality of nodes as a starting node representing a first process for completion of the task;
   identify a second node of the plurality of nodes as an ending node representing a last process for completion of the task;
   generate a first sequence order of node execution for completion of the task based on a target parameter;
   identify an anomalous node in the first sequence order;
   generate a second sequence order of node execution for completion of the task based on the target parameter; and
   execute the nodes in the generated second sequence order.

2. The system of claim 1, wherein the second sequence order is different from the first sequence order.

3. The system of claim 2, wherein the second sequence order is different from the first sequence order after a node prior to the node with the identified anomaly.

4. The system of claim 3, wherein execution of the second sequence order bypasses the anomalous node.

5. The system of claim 1, wherein each node is associated with a performance parameter.

6. The system of claim 5, wherein the target parameter is achieved based on a combination of the performance parameters.

7. The system of claim 5, wherein each node is associated with a node policy.

8. The system of claim 7, wherein generation of the first sequence order further comprises processor-executable program code to:
   execute Dijkstra's algorithm using the performance parameter and the node policy for each node of the plurality of nodes.

9. The system of claim 1, wherein the task includes nodes in different systems.

10. The system of claim 1, further comprising processor-executable program code to:
    receive an indication an anomaly of the anomalous node is corrected; and
    restore the first sequence order in response to the received indication.

11. A method comprising:
    receiving a first task map including a plurality of nodes, each node representing an executable process for completion of a task;
    identifying a first node of the plurality of nodes as a starting node representing a first process for completion of the task;
    identifying a second node of the plurality of nodes as an ending node representing a last process for completion of the task;
    generating a first sequence order of node execution for completion of the task based on a target parameter;
    identifying an anomalous node in the first sequence order;
    generating a second sequence order of node execution for completion of the task based on the target parameter; and
    executing the nodes in the generated second sequence order, wherein the second sequence order is different from the first sequence order after a node prior to the anomalous node.

12. The method of claim 11, wherein execution of the second sequence order bypasses the anomalous node.

13. The method of claim 11, wherein execution of each node is associated with a performance parameter.

14. The method of claim 13, wherein the target parameter is achieved based on a combination of the performance parameters.

15. The method of claim 13, wherein each node is associated with a node policy.

16. The method of claim 15, wherein generating the first sequence order further comprises:
    executing Dijkstra's algorithm using performance parameter and node policy for each node in plurality of nodes.

17. The system of claim 1, further comprising:
    receiving an indication an anomaly of the anomalous node is corrected; and
    restoring the first sequence order in response to the received indication.

18. A non-transitory computer readable medium having executable instructions stored therein to perform a method, the method comprising:

receiving a first task map including a plurality of nodes, each node representing an executable process for completion of a task;

identifying a first node of the plurality of nodes as a starting node representing a first process for completion of the task;

identifying a second node of the plurality of nodes as an ending node representing a last process for completion of the task;

generating a first sequence order of node execution for completion of the task based on a target parameter;

identifying an anomalous node in the first sequence order;

generating a second sequence order of node execution; and executing the nodes in the generated second sequence order.

19. The medium of claim 18, wherein execution of the second sequence order bypasses the anomalous node.

20. The method of claim 18, wherein generating of the first sequence order further comprises:

executing Dijkstra's algorithm using a performance parameter and a node policy for each node in the plurality of nodes.

\* \* \* \* \*